Patented May 2, 1950

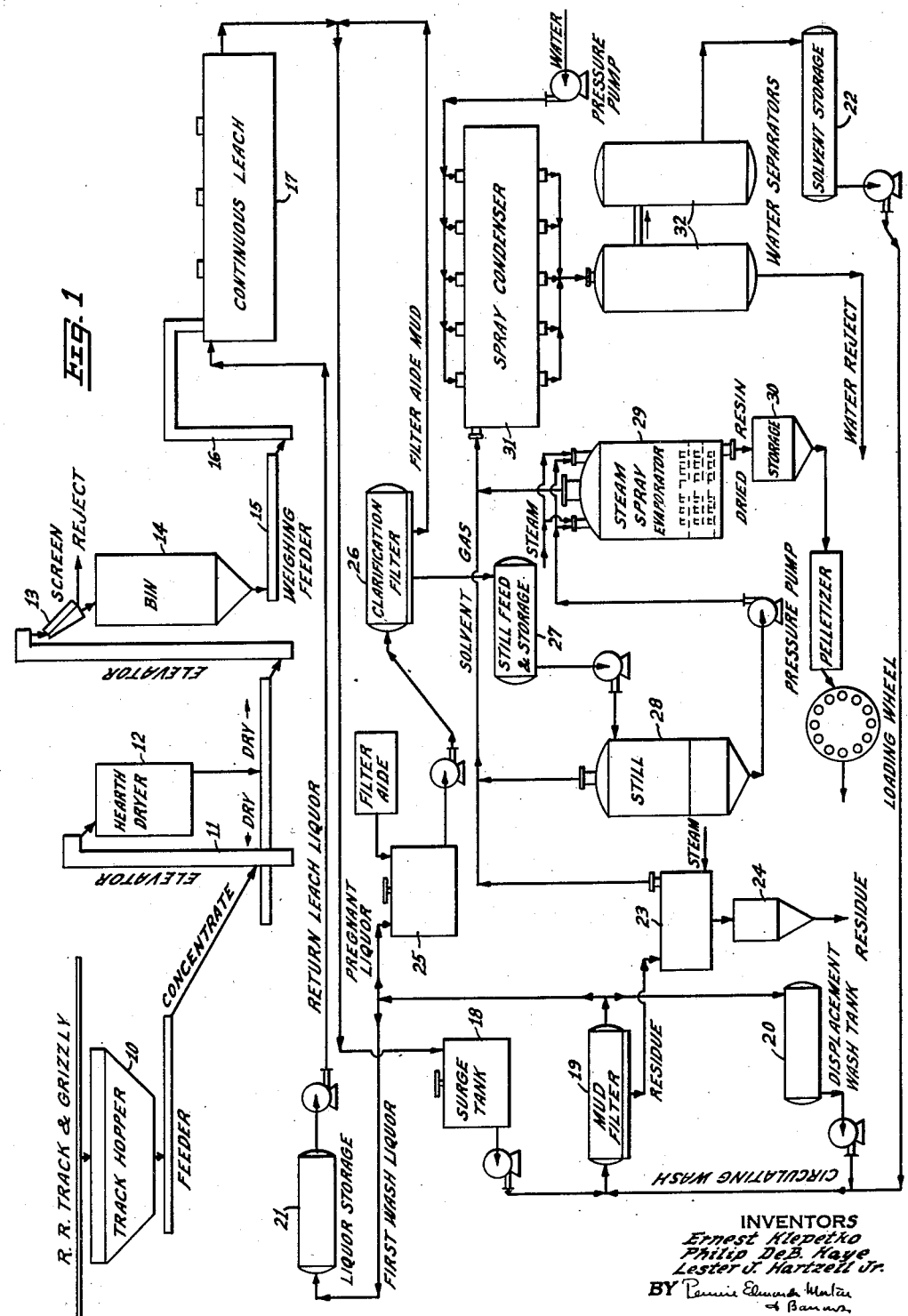

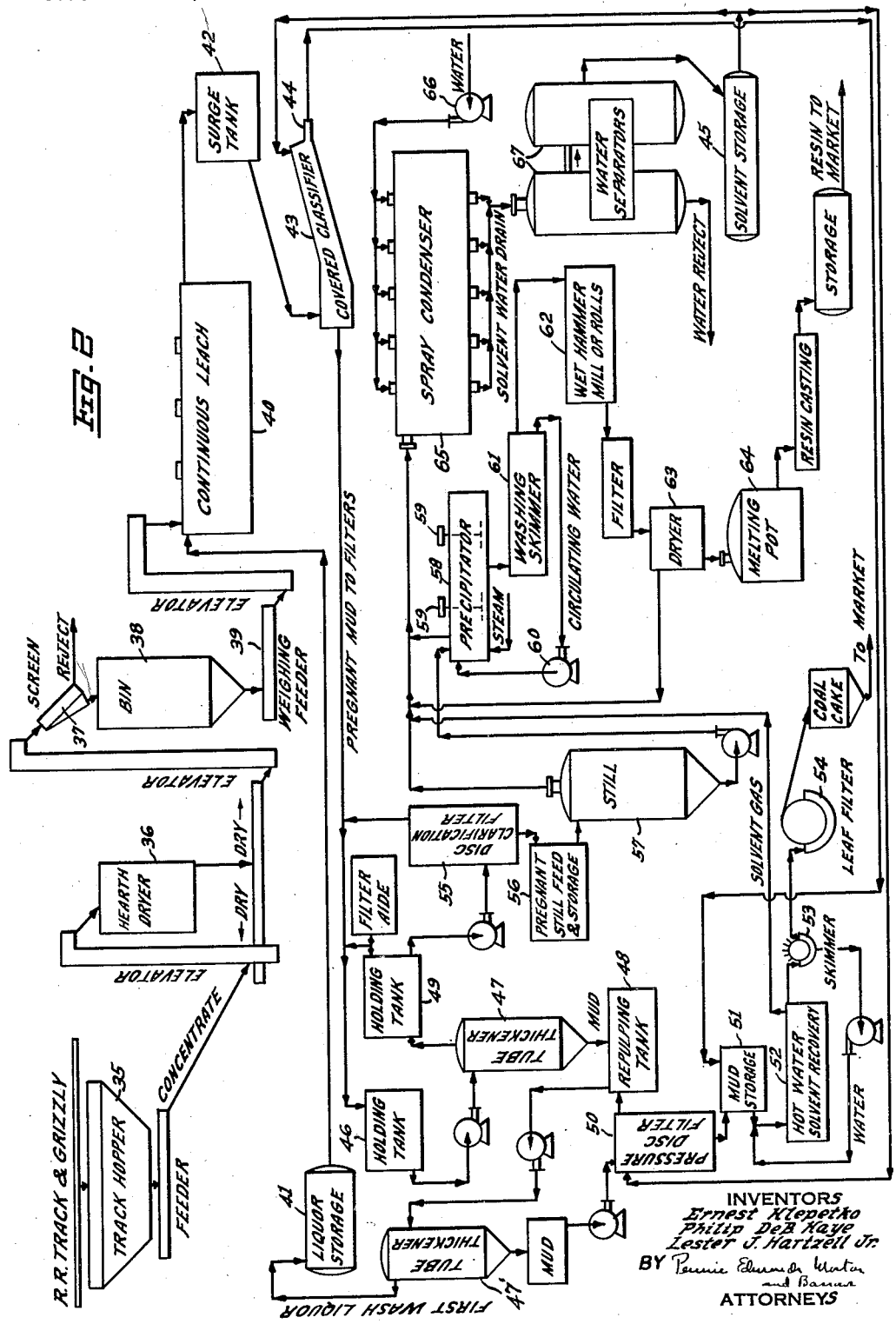

2,506,300

UNITED STATES PATENT OFFICE 2,506,300

RECOVERING REFINED RESINS FROM COAL

Ernest Klepetko and Philip de B. Kaye, Bauer, and Lester J. Hartzell, Jr., Tooele, Utah, assignors to Combined Metals Reduction Company, Stockton, Utah, a corporation of Utah Application June 17, 1946, Serial No. 677,393

10 Claims. (Cl. 260—107)

This invention relates to the recovery of a refined resin product from a mixture of coal and resin, and provides an improved resin-refining process of the solvent extraction type, embodying a number of new and improved features, that is well adapted to refining resin flotation concentrates such, for example, as may be produced from resin-bearing coal as described in either of our copending applications Serial No. 677,394, filed June 17, 1946, and Serial No. 686,132, filed July 25, 1946.

Some coals, such, for example, as many of the Utah coals, contain substantial amounts of fossil resins. These resins are of value for many industrial purposes, as in the production of dielectric and other varnishes, for use in printer's ink, for use in the preparation of resinous waterproofing agents, for incorporation in synthetic rubber compositions and rubber cements and in other resin-containing products. Proposals heretofore made for recovering these resins have not been entirely satisfactory, either because the recovered resin has been excessively contaminated with coal impurities, or because only incomplete recovery of the resin has been obtained.

The improved solvent extraction process of the present invention is effective for producing a refined resin product of high purity and excellent physical quality. The new process may be applied economically to the treatment of resin concentrates obtained from resin-bearing coals to achieve substantially complete recovery of the resin in purified form. Resin concentrates for treatment by the new process may be produced by a selective flotation operation (as described in the applications referred to above), by electrostatic means, or by flotation in heavy liquors. Concentrates produced by the selective flotation method generally will contain a somewhat greater amount of fine material than concentrates produced by the other methods (because of the maximum recovery of resin particles of all sizes that is effected by the float process), but in general all such concentrates will contain somewhat over 70% resin. These concentrates as such are not acceptable for industrial use, but must be refined to obtain a resin product containing upwards of 99% resin in order to find a ready market. The new solvent-extraction process is admirably suited to refining such resin concentrates, but it may be adapted also to the treatment of other coal-resin mixtures containing worthwhile amounts of resin.

The new method for obtaining a refined resin product involves leaching the concentrates or other mixture of coal and resin with a solvent for the resin, separating the insoluble coal residue from the resulting leach solution of resin in the solvent, and subsequently separately recovering the solvent and the resin by volatilizing the solvent from the solution. In accordance with the invention, each of the basic steps of the process incorporate improved features rendering the process particularly well suited to economic refining of coal resins.

We have discovered that if the mixture of coal and resin contains a substantial percentage of moisture, a semi-gelatinous emulsion is likely to be formed during leaching, and this emulsion hampers subsequent separation of the insoluble material from the solution. Accordingly, the invention contemplates drying the mixture of coal and resin to reduce its moisture content to not more than 5% by weight prior to leaching.

Separation of the insoluble coal residue from the resin solution also is hampered if the specific gravity of the leach solution is high. Consequently the invention contemplates utilizing an amount of solvent corresponding to at least about 1000 gallons per ton of coal-resin mixture, so as to produce a leach solution which is sufficiently thin for easy separation of the insoluble residue.

We have found that treatment of the leach solution to separate the solvent from the resin by conventional distillation procedures is not effective. The first half or more of the solvent distills off readily enough, but further removal of solvent from the remaining concentrated solution is difficult and slow if conventional methods are employed. In accordance with the invention, rapid and substantially complete removal of the solvent from the concentrated solution is effected readily by directly contacting the concentrated solution with an aqueous medium at a temperature at least about as high as the boiling point of the solvent. The aqueous medium may be either hot liquid water or steam. In either case, the solvent may be recovered substantially completely for reuse in the process, and the resin may be recovered in a highly purified form. At the same time, volatilization in the presence of water vapor or steam of the combustible solvents generally used in the process greatly reduces the explosion hazard involved in this operation.

These and other features of the invention are incorporated in the two somewhat different embodiments of the new process described below with reference to the accompanying drawings, in which Fig. 1 is a diagrammatic flow sheet of a process according to the invention; and Fig. 2 is a diagrammatic flow sheet of a somewhat modified process according to the invention.

Referring first to Fig. 1, the resin flotation concentrate or other mixture of coal and resin from which the resin is to be recovered is delivered by railroad car or otherwise to a hopper 10, from which it is fed through an elevator 11 to a steam-heated multi-hearth drier or other drying apparatus 12. The moisture content of the concentrates is reduced in the drier to less than about 5% by weight of moisture. As previously stated, we have found that it is inadvisable for the moisture content of the concentrate to exceed this value at the time of leaching, or otherwise a gelatinous emulsion may form which will hamper subsequent removal of the insoluble material from the leach solution.

A portion of the dried concentrates discharged at the bottom of the drier is returned to the elevator 11 and mixed with fresh incoming wet concentrates. The resulting mixture of wet and dry concentrates is fed by the elevator 11 to the drier. Thus the charge to the drier 12 is not all wet concentrates, but a mixture of fresh wet concentrates and previously dried concentrates. This mixing of wet and dry concentrates, involving recycling a portion of the dried concentrate back through the drier, is advantageous to prevent agglomeration of the concentrate into lumps during the drying operation. Lumpy agglomerates of concentrate are more apt to retain moisture even after passing through the drier, and in any event require longer in the leaching operation to dissolve all of the resin which they contain.

The remaining portion of the dried concentrates is passed to a second elevator which discharges over a screen 13 into a storage bin 14. Foreign material such as coarse rocks that have found their way into the concentrate are rejected by the screen 13, while the concentrate itself flows into the bin.

The dried concentrates are taken from the bin 14 and are fed by a weighing feeder 15 through a conveyor 16 to a leaching tank 17. The leaching tank advantageously is equipped for continuous leaching, but batch leaching is entirely feasible and may be employed if desired.

In the leaching tank, the concentrates are brought into contact with a solvent for the resin they contain. Many different solvents are available, including various alcohols, benzene, and various petroleum hydrocarbons. Hexane, however, is a particularly desirable solvent. It is readily available commercially, and the commercial product has a moderate initial boiling point and a comparatively low finishing boiling point, so that it is relatively easy to separate from the resin and to recover for reuse in the process. Moreover, it is a good solvent for the resin constituents which it is commercially desirable to recover from mixtures of coal and fossil resin.

Whether the leaching operation is conducted continuously or in a batch operation, the time of contact between the solvent and the mixture of resin and coal in the leaching vessel should be long enough to insure substantially complete dissolution of the resin. In the case of leaching resin concentrates having a screen analysis of about 50% plus 100-mesh with hexane, a leaching time of about two hours is generally sufficient to insure extraction of all of the resin. In general, the optimum duration of the leaching operation depends on the size and other physical characteristics of the concentrate particles and on the properties of the solvent.

Leaching temperatures above room temperature have little effect on the speed with which the leaching operation proceeds, or on the completeness with which the resin is extracted (assuming that an adequate amount of solvent is employed). However, such higher leaching temperatures are advantageous for producing a leach solution of low viscosity, from which the insoluble components of the coal-resin mixture may be readily separated. For this reason it is often desirable to conduct the leaching operation at a temperature elevated above room temperature, but, of course, appreciably below the initial boiling point of the solvent (say at least 5° C. below such boiling point).

The amount of solvent employed in relation to the amount of resin concentrate being leached, like the leaching temperature, affects the ease with which the insoluble constituents may be separated from the solution. Optimum results are obtained using an amount of solvent corresponding to at least about 1000 gallons per ton of 70% resin concentrates. This amount of solvent yields a solution that is sufficiently thin so as to permit separation of the insoluble material quite easily. Using hexane as the solvent, for example, we have found that higher concentrations lead to difficulties in separating the insoluble matter, and that the specific gravity of the pregnant leach solution for this reason should not exceed about 0.8.

When a highly volatile solvent such as hexane is employed in the leaching operation, the leaching vessel is, of course, fully enclosed, as is all other apparatus in which the solvent, or any leach or wash solution is contained.

The leach solution, admixed with insoluble material, is piped to a surge tank 18 which serves as a storage vessel for one or more mud filters 19. As required by the filtering schedule, the slurry of leach solution and insoluble material is pumped or otherwise transferred from the surge tank to and through the mud filter, which serves to remove most of the insoluble matter. Advantageously no effort is made to effect final and complete separation of the insoluble matter from the leach solution at this stage. Rather, it is generally more economical to filter first through a fairly coarse filtering medium to achieve rapid separation of a large part of the insoluble matter from the solution and to effect removal of the last small amount of insoluble matter in a subsequent clarification operation.

Filtering is a particularly satisfactory method of removing the insoluble matter. If the leaching operation has been conducted under proper conditions, commercial filtering rates of 10 gallons per square foot of filter area per hour are readily attained. Other methods for separating the bulk of the insoluble residue may, however, be employed with very good results. For example, tube thickeners, or, if desired, tray thickeners may be used for this purpose.

While of the available means for removing the insoluble matter is used is primarily a matter of choice, but in any event it is best to provide for washing the separated solids to recover adhering resin laden solution. Displacement washing is thorough and economical in the use of wash liquors. Using the displacement washing circuit illustrated in Fig. 1, pumping of leach solution from the surge tank 18 through the filter 19 is discontinued after a substantial filter cake has built up in the filter. Thereupon the filter cake is subjected to its first washing. The washing liquor used at this stage is the wash liquor that resulted from final washing of a previous filter cake and that has been stored meanwhile in a displacement wash tank 20. This washing liquor, which is pumped or otherwise fed from the tank 20 into the mud filter and through the filter cake therein, consists of a very dilute solution of the resin in the hexane or other solvent employed. In the filter 19 it washes out a large portion of the resin solution still adhering to the filter cake. The first wash filtrate, enriched somewhat in its resin content as a result of its passage through the residue in the filter, is transferred to a liquor storage tank 21 which serves as a reservoir of solvent for the leaching operation, and from which the liquor is pumped or otherwise transferred to the leaching tank 17 as required.

After completion of the first washing operation, the filter cake in the filter 19 is washed a second time using fresh solvent pumped from a solvent storage tank 22. This fresh solvent removes virtually all of the resin solution still adhering to the filter cake after the first wash, and the filtrate from this second washing is transferred to the displacement wash tank 20 where it is held for use as the first wash liquor in washing the next filter cake to be accumulated in the filter 19.

After completion of the second wash, the filter cake residue from the filter 19 is transferred to a steam heated solvent recovery vessel 23. This washed residue is substantially free of resin, but sufficient solvent from the final wash adheres to it to make recovery of the solvent worthwhile. In the vessel 23, the residue is heated by steam or otherwise to volatilize and expel the solvent, which is collected and condensed. The solvent-free residue may be discharged from the vessel 23 to a storage hopper 24. This residue consists chiefly of a finely-divided coal, and as such may be sold as a fuel.

The pregnant liquor filtrate resulting from initial filtration of the leach liquor in the mud filter 19 is held in a tank 25 which serves as a storage vessel for a clarification filter 26. This pregnant liquor still contains a small quantity of finely-divided insoluble material that was not separated in the first filtration. To facilitate its removal, a filter aide such as wood or paper pulp or diatomaceous earth, may be mixed with the pregnant liquor in the holding tank 25. The pregnant liquor with the added filter aide is pumped to and through the clarification filter 26, in which the filtering medium is sufficiently fine to effect substantially complete removal of both the filter aide and the fine insoluble material still remaining in the pregnant liquor. The clarified pregnant solution is transferred from the clarification filter 26 to a storage tank 27.

Filter aide mud that is separated from the solution in the clarification filter contains considerable adhering resin solution. The volume of this mud is low, however, and instead of washing it to recover its resin and solvent content, it is advantageously transferred to the surge tank 18 and is mixed with leach liquor therein stored for primary filtration on the mud filter 19. The filter aide collects with the coal residue in the mud filter 19, but the amount of filter aide is small as compared with the amount of coal in this residue. Consequently, even though the filter aide may be incombustible, it does not seriously impair the fuel value of the residue or increase its ash content excessively.

The clarified pregnant solution is pumped from the storage tank 27 to a simple still 28, wherein it is heated to volatilize the solvent. Operation of the still may be continuous or intermittent, as desired. The still may be heated directly by hot combustion gases, or it may be steam heated. When hexane is employed as a solvent, steam heating is somewhat safer and may be preferred for this reason to heating with combustion gases. The distillation of the solvent proceeds with no particular difficulty to the point of volatilizing 50% to 65% of the solvent. The volatilized solvent is of course collected and condensed to recover it for reuse in the process.

By the time one-half to two-thirds of the solvent has been distilled, the now concentrated solution in the still is quite viscous, and it is very difficult to eliminate the remaining solvent by ordinary distillation methods. This is in part due to the fact that as the solution becomes concentrated, continued application of heat to the liquor in the still causes numerous small bubbles to form in the solution. These bubbles do not readily escape from the liquor when its concentration and viscosity have become considerable. The heat-insulating properties of the highly porous liquor in which these bubbles have formed makes it impractical to transfer further heat to the liquor efficiently, and hence further distillation of the solvent is for all practical purposes prevented.

We have found that the residual solvent may be expelled completely and efficiently by heating the concentrated solution in direct contact with a hot aqueous medium, either hot liquid water or steam, at a temperature at least about as high as the boiling point of the solvent. Accordingly, after about 50% to 65% of the solvent has been volatilized in the still 28, the concentrated liquor remaining in the still is transferred to a vessel in which it may be heated directly by a hot aqueous medium.

As shown in Fig. 1, the concentrated liquor from the still 28 is pumped to a steam-spray evaporator 29 of special construction. This apparatus comprises an enclosed vessel, the upper interior portion of which forms a spray chamber. Near the bottom of the vessel a series of rabbled hearths, spaced vertically from one another, are mounted. The hearths advantageously are steam-jacketed for heating purposes, and the rabbles with which the hearths are provided are arranged to rake solid material across each hearth to an opening through which it falls to the hearth next below. The material falling to the bottom hearth is raked to a discharge opening.

The concentrated resin solution is sprayed into the upper spray chamber of the vessel 29, together with a spray of live steam. In consequence of the direct contact between the solution and the hot live steam sprayed with it into the evaporator vessel, the solvent present in the concentrated solution is rapidly and almost completely volatilized. The volatilized solvent and the steam are withdrawn for subsequent recovery of the solvent through a conduit connected at the top of the vessel 29. The resin present in the solution sprayed into the vessel is substantially nonvolatile at the temperatures employed, and consequently it falls to the uppermost of the rabbled hearths in the bottom portion of the vessel. As it reaches the first hearth, the precipitated resin may still contain a small amount of unvolatilized solvent. However, as the resin is raked across each steam-heated hearth, this small amount of solvent is volatilized and passes upwardly into the spray chamber, from which it escapes with the steam and the remaining volatilized solvent.

The steam-heated hearths advantageously are maintained at a temperature of about 100° C. or slightly higher. At this temperature the last small amount of solvent remaining in the resin as it falls to the hearths is readily expelled, and condensation on the hearths of the steam sprayed in at the top of the vessel is prevented. The resin raked from the last hearth to the discharge opening at the bottom of the evaporator 29 is essentially completely dried and of high purity. It may be conveyed to a storage vessel 30, from which it may be withdrawn as required for bagging direct, or it may be pelletized and loaded into suitable containers for shipment to the market.

The solvent volatilized in the evaporator vessel 29, together with the solvent vapor from the still 28 and from the vessel 23 in which the mud filter residue is heated, is conducted to a spray condenser 31. Here the solvent vapor encounters a series of sprays of cool water pumped in through the top of the condenser vessel, and are condensed to liquid. The water and the condensed solvent flow out through the discharge openings at the bottom of the condenser to separating vessels 32 in which the solvent and the water are separated. Other types of condensers than spray condensers may, of course, be employed, but spray condensing is efficient and the apparatus required is relatively inexpensive. Using a solvent such as hexane which is not miscible with water, it is a simple matter to separate the solvent from the water with which it has become admixed. In the water separators the hexane floats quickly to the surface and may be withdrawn to the solvent storage tank 22 wherein it is held for recycling through the process. The water that collects in the separating vessels 32 may be withdrawn separately from the hexane and may be discharged to waste. The solubility of hexane in water is extremely low so that the amount of this solvent lost with the water discharged from the separating vessel is very small.

The modified embodiment of the new process for which a flow diagram is presented in Fig. 2 makes use of the same fundamental sequence of steps as the embodiment described above in connection with Fig. 1, but in this modified embodiment different means are employed for effecting several of the steps of the process. As indicated in Fig. 2, resin concentrates or other mixture of coal and resin are brought into the plant by railroad car and are discharged into a track hopper 35. The resin-bearing material is fed from the hopper to a hearth drier 36 for reducing its moisture content to less than about 5% by weight. As described above in connection with Fig. 1, a portion of the dried concentrate discharged from the drier is mixed with fresh incoming moist concentrate and is recycled through the drier, to prevent agglomeration of the concentrate into lumps. Another portion of the dried concentrate is passed over a screen 37, for screening out coarse foreign material, to a storage bin 38, from which it may be withdrawn as required.

Dried resin concentrates are fed by a weighing feeder 39 to a leaching vessel 40, wherein the resin is dissolved in an appropriate amount of solvent supplied from a storage tank 41. The leaching step, which may be conducted either continuously or as a batch operation, advantageously is carried out substantially as described above with reference to Fig. 1.

The leach solution, carrying in suspension the insoluble constituents of the resin concentrate, is transferred to a surge tank 42, from which it is pumped or otherwise fed substantially continuously to a covered screw-type classifier 43, such as a covered Akins classifier. A considerable portion of the solid matter settles from the leach solution in the classifier and is carried upwardly by the classifier screw to a discharge outlet 44 located above the surface of the resin solution. The separated solids are washed in the classifier, prior to being discharged, by fresh solvent from a storage tank 45. Washing of the separated solids in the classifier occurs, of course, at a point above the surface of the resin solution therein. The pregnant leach liquor overflow from the classifier is conducted to a holding tank 46 for further treatment to remove the solid material it still carries in suspension.

The provision of the classifier 43 in the leach liquor circuit is particularly advantageous where the resin concentrates or other mixture of coal and resin contain a fairly high percentage of insoluble solids. In such a case the classifier provides a convenient means for separating a considerable portion of these solids, thus facilitating further treatment of the liquor.

The leach liquor from the holding tank 46 is pumped or otherwise passed to a tube thickener 47 of the filter-thickener type, such, for example, as a pressurized Oliver-Borden tube-filter thickener. Here the bulk of the solid material still remaining in the leach liquor is separated out as a thickened mud, which is discharged to a repulping tank 48. The pregnant liquor from the tube thickener is passed to a holding tank 49 preparatory to further treatment.

To facilitate separation of the solids remaining in the leach liquor supplied to the tube thickener 47, a filter aide such as wood or paper pulp or diatomaceous earth may be added to the leach liquor prior to introducing it into the tube thickener.

The thickened mud discharged from the tube thickener 47 contains considerable resin solution. To recover this solution, the mud is repulped in the repulping tank 48 with additional solvent, and the repulped mud is then passed to a second tube thickener 47', which may be of the same type as the first tube thickener 47. The solids-free liquor withdrawn from the second tube thickener 47' is passed to the liquor storage tank 41 from which the leaching vessel 40 is supplied with solvent. Thus the solvent supplied to the leaching vessel contains some resin in solution, but not enough to interfere with efficient leaching operations.

The thickened mud discharged from the second tube thickener 47' still contains some resin and considerable solvent. To recover these valuable components, the mud is pumped or otherwise passed to a pressure disc filter 50. Here the solution is filtered from the solid component of the mud, and the filtrate is passed to the repulping tank 48 for use in repulping additional mud from the first tube thickener 47. To insure substantially complete recovery of the resin, the filter cake built up in the pressure disc filter 50 is washed one or more times with fresh solvent from the storage vessel 45. The wash solution also is passed to the repulping tank 48, so that the liquor with which the mud is repulped is more dilute in resin content than the solution component of the mud as it is discharged into this tank. The volume of fresh solvent used to wash the residue in the filter 50 is correlated with the volume of solution separated out in the second tube thickener 47' so as to supply liquor to the storage tank 41 at about the same rate as it is used in the leaching operation.

After washing, the filter cake deposited on the disc filter 50 is removed to a storage vessel 51. This storage vessel also receives the solid material discharged from the classifier 43 through its upper discharge opening 44. The solids in the tank 51 are wet with solvent, and to recover the solvent the solids are passed to a solvent recovery vessel 52. The solids are mixed in this vessel with hot water at a temperature preferably close to or slightly above the boiling point of the solvent. When hexane is used as the solvent, a hot water temperature of about 88° C. (the finishing boiling point of commercial hexane) or slightly higher is preferable. The hot water with which the solids are brought in contact in this vessel causes the solvent to volatilize, and the solvent vapor is collected in order to be condensed for reuse in the process.

The solvent-free slurry of hot water and solids discharged from the vessel 52 is passed to a skimmer 53 which effects a fair separation of the solids from the water. The separated hot water, with such solids as it still contains, is recirculated back into the solvent recovery vessel 52, and the skimmed solids are passed to a leaf filter 54, by means of which most of the residual water is separated. The filtered solids are very largely composed of coal, and the filter cake from the filter 54 therefore may be marketed as a finely-divided coal fuel.

The pregnant liquor that was separated from the solids in the first tube thickener 47 and passed to the holding tank 49 usually still contains a small amount of finely-divided insoluble matter. To separate this solid impurity from the solution, the pregnant liquor is pumped to and through a clarification filter 55. If desired, a filter aide may be mixed with the pregnant liquor in the holding tank 49 prior to filtering. The clarified pregnant solution filtrate is discharged into a storage tank 56.

Some resin-bearing solution will adhere to the filter cake deposited in the clarification filter, but rather than recovering this solution by washing or otherwise, the filter cake may be admixed with the pregnant liquor from the classifier, and may be recirculated with it to the tube thickener 47. The small volume of the filter cake deposited in the clarification filter makes this procedure feasible and generally preferable.

The clarified pregnant solution is passed from the storage tank 56 to a still 57 in which a large portion of the solvent is volatilized. This still may be of the same character as the still 28 described above with reference to Fig. 1, and may be similarly operated.

As above stated, it is not practical to remove all of the solvent by simple distillation, and accordingly after about 50 to 65% of the solvent has been distilled off, the now concentrated solution is pumped from the still to a precipitating vessel 58. This vessel is essentially a closed tank to which suitable piping connections have been made and which is equipped with stirring devices 59.

In the precipitating vessel 58, the concentrated solution from the still is mixed with hot water introduced by a pump 60. The temperature of the water should be close to or slightly above the boiling temperature of the solvent. When hexane is employed as the solvent, a water temperature of about 88° C. or slightly higher is very satisfactory. To maintain this temperature, live steam may be introduced as required into the precipitating vessel. The direct contact between the hot water and the concentrated solution in the precipitator 58 causes the solvent to volatilize substantially completely. The stirring devices 59 serve to insure effective contact between the hot water and the solution, and so facilitate volatilization of the solvent. The volatilized solvent is collected in order to be condensed for recovery and reuse in the process.

The resin is precipitated in the vessel 58 in substantially pure form, and remains in suspension in the water. To recover it, the water and resin are withdrawn, either continuously or intermittently, to a skimmer 61. The bulk of the resin accumulates as scum on the surface of the water and may be skimmed off. The water, which is still hot and contains some resin in solution, is recirculated by the pump 60 to the precipitator for reuse in the treatment of a further quantity of concentrated solution.

The resin removed in the skimmer may be passed through a hammer mill or rolls 62 to break up lumps, and then may be filtered to remove excess water. The filtered resin may still contain a small amount of solvent which was not volatilized by the hot-water treatment. To free the resin from this solvent and to recover the solvent, the filtered resin may be heated on a hearth drier 63 at a temperature advantageously slightly above 100° C. Any solvent volatilized in the drier may be collected for recovery by condensation. The dried resin may be prepared in any suitable way for the market, as by melting it in a pot 64 and casting into slabs. The recovered resin is of high purity and of excellent quality for the resin-consuming industries.

The solvent volatilized in the still 57 and in the precipitating vessel 58, together with that volatilized in the solvent-recovery apparatus 52 and in the resin drier 63, is passed to a spray condenser (or other condensing equipment) 65. In the spray condensers, the solvent vapor comes in direct contact with a spray of cold water introduced by means of a pump 66, and is thereby condensed to liquid. The mixture of condensed solvent and water is withdrawn from the condenser to water separators 67. The water separated in these vessels is discharged to waste, and the solvent is withdrawn separately and collected in the fresh solvent storage tank 45.

It is evident from the foregoing description of the typical processes for which flow diagrams are presented in the accompanying drawings, that various modifications may be made in the procedure for carrying out each of the several steps characteristic of the new process. Accordingly, it is not to be assumed that the process is limited to either of the specific embodiments described in detail herein.

While no particular mention has been made in the foregoing description of conducting any of the operations of the process at superatmospheric pressures, it is understood that some or all of the operations carried out in the presence of solvent may be so operated if desired. For example, the still in which the first half or so of the solvent is volatilized, the hot-water precipitator 58, and the spray condenser may be operated under say 25 pounds per square inch pressure, with the advantage that smaller and more compact equipment will serve for treating a given amount of resin solution per day.

The new process is adequately flexible to be adapted to virtually any mixture of coal with a recoverable amount of resin. For economic reasons, however, the process is most satisfactorily applied to a resin concentrate containing a fairly high proportion of recoverable resin. A resin of high quality is produced, and the associated coal impurities are separated in a form in which they find a ready market as fuel. If proper precautions are taken to guard against mechanical losses of solvent, and if the equipment is properly enclosed, solvent consumption is very low in relation to the amount of resin recovered. Except for the possible use of a filter aide, no reagent other than solvent is required for use in the process. The apparatus required is simple and not particularly expensive either in first cost or to operate. The process is, therefore, well adapted to recovering in commercial form and with economy the valuable resin content present in certain commercially mined coals.

We claim:

1. The cyclic method of obtaining a resin concentrate comprising a refined resin product from a resin concentrate comprising a mixture of finely divided coal and resin which comprises drying the concentrate at about 100° C. to not more than about five percent by weight of moisture, leaching the dried concentrate for at least about two hours with a volatile solvent for the resin, the amount of solvent being at least about 1000 gallons per ton of concentrate and sufficient to yield a leach solution having a specific gravity not greater than about 0.8, filtering the insoluble coal residue from the resulting leach solution of resin in the solvent, washing the insoluble coal residue with fresh resin solvent to extract resin remaining therein, utilizing the resulting wash solution as the solvent for extracting resin from a further quantity of the concentrate, subjecting the resin leach solution to a distillation operation to remove therefrom a substantantial part but not all of the solvent, directly contacting the residual solution from said distillation operation with a hot liquid aqueous medium to volatilize the balance of the solvent therefrom and precipitate the resin in solid form, heating the washed insoluble coal residue to drive off the solvent adhering thereto, condensing the solvent volatilized (1) in the distillation operation, (2) the hot aqueous treatment of the distillation residue, and (3) the heating of the washed coal residue by introducing such volatilized solvent into direct contact with a spray of cold liquid water, recoving the condensed solvent by separating it from said water, and utilizing the resulting condensed and recovered solvent in washing a further quantity of leached coal residue.

2. The method of obtaining a refined resin product from a resin concentrate comprising a mixture of finely divided coal and resin which comprises drying the concentrate at about 100° C. to not more than about five percent by weight of moisture, leaching the thus dried concentrate with a solvent comprising a substantial proportion of hexane, and subsequently filtering the leach solution.

3. In a method for obtaining a refined resin product from a resin concentrate comprising a mixture of finely divided coal and resin, involving leaching the concentrate in a solvent for the resin and subsequently filtering the leach solution, the improvement which comprises drying the concentrate at about 100° C. to reduce its moisture content to not more than about five percent by weight and thereafter leaching the concentrate with the resin solvent for at least about two hours, whereby the subsequent filtration of the leach solution is facilitated.

4. In a method for obtaining a refined resin product from a resin concentrate comprising a mixture of finely divided coal and resin, involving leaching the concentrate in a solvent for the resin, the improvement which comprises drying the concentrate at about 100° C. prior to leaching to reduce its moisture content to not more than about five percent by weight, mixing a portion of the dried concentrate with fresh moist concentrate, recycling the resulting mixture of moist and dried material through the drying operation, and passing the portion of the dried concentrate that is not recycled to the leaching operation.

5. In a method for obtaining a refined resin product from a resin concentrate comprising a mixture of finely divided coal and resin involving leaching the concentrate in a solvent for the resin and subsequently filtering insoluble coal residue from the leach solution, the improvement which comprises utilizing in the leaching operation an amount of solvent corresponding to at least about 1000 gallons per ton of concentrate and conducting the leaching operation for at least about two hours, whereby the solution formed in the leaching operation is sufficiently thin to facilitate filtering it from the insoluble residue.

6. In a method for obtaining a refined resin product from a resin concentrate comprising a mixture of finely divided coal and resin involving leaching the concentrate in a resin solvent comprising a substantial proportion of hexane and subsequently filtering insoluble coal residue from the leach solution, the improvement which comprises drying the concentrate to less than about five percent by weight of moisture prior to leaching, utilizing in the leaching operation a sufficient amount of solvent in proportion to the amount of concentrate employed therein so that the specific gravity of the solution formed during the leaching operation is not greater than about 0.8, and continuing the leaching operation for at least about two hours.

7. In obtaining a refined resin product from a mixture of coal and resin involving preparing a solution of the resin in a volatile solvent, the method of separating the resin from the solvent in which it is dissolved which comprises distilling a substantial part but not all of the solvent from the solution to form a concentrated resin solution, mixing the concentrated resin solution with a body of liquid water at a temperature at least about as high as the boiling point of the solvent, whereby substantially all of the remaining solvent is volatilized and the resin collects in suspension in the water, and separating the resin from the water.

8. In obtaining a refined resin product from a mixture of coal and resin involving preparing a solution of the resin in a volatile solvent, the method of separating the resin from the solvent in which it is dissolved which comprises distilling a substantial part but not all of the solvent from the solution to form a concentrated resin solution, mixing the concentrated resin solution with a body of liquid water at about the boiling temperature of the solvent, withdrawing and recovering the solvent thereby volatilized from the solution, separately withdrawing water containing resin in suspension and separating the bulk of the resin from the water, and returning the water for re-use in mixing with a further quantity of solution.

9. In obtaining a refined resin product from a mixture of coal and resin involving preparing a solution of the resin in a volatile petroleum hydrocarbon solvent, the method of separating the resin from such solvent which comprises distilling a substantial part but not all of the solvent from the solution to form a concentrated resin solution, mixing the concentrated resin solution with a body of liquid water at about the boiling temperature of the solvent, withdrawing and recovering the solvent volatilized from the solution, separately withdrawing water containing substantially solvent-free resin in suspension therein, and separating the resin from the water.

10. In obtaining a refined resin product from a mixture of resin and coal, the steps which comprise leaching the mixture with a solvent comprising mainly hexane, separating insoluble coal residue from the leach solution, subsequently mixing the resin-hexane solution with a body of liquid water heated to a temperature of at least about 88° C., whereby the hexane is volatilized and substantially solvent-free resin is precipitated in solid form, condensing the volatilized hexane and returning it to the process for use in leaching a further quantity of the coal-resin mixture, and separately recovering the precipitated solid resin.

ERNEST KLEPETKO.
PHILIP DE B. KAYE
LESTER J. HARTZELL, JR.

REFERENCES CITED

The following references are of record in the file of this patent:

UNITED STATES PATENTS

| Number | Name | Date |
|---|---|---|
| 1,104,456 | Turner | July 21, 1914 |
| 1,862,945 | Schlotterhose | June 14, 1932 |
| 2,330,887 | Higgens | Oct. 5, 1943 |
| 2,409,216 | Lee | Oct. 15, 1946 |

Patent No. 2,506,300

Certificate of Correction

ERNEST KLEPETKO ET AL.

May 2, 1950

It is hereby certified that error appears in the printed specification of the above numbered patent requiring correction as follows:

Column 11, lines 25 and 26, strike out the words "a resin concentrate comprising"; and that the said Letters Patent should be read with this correction therein that the same may conform to the record of the case in the Patent Office.

Signed and sealed this 1st day of August, A. D. 1950.

[SEAL]

THOMAS F. MURPHY,
*Assistant Commissioner of Patents.*